(12) United States Patent
Liu et al.

(10) Patent No.: US 8,204,005 B2
(45) Date of Patent: Jun. 19, 2012

(54) WIRELESS COMMUNICATION DEVICE AND METHOD FOR DYNAMIC BIDIRECTIONAL AGGREGATION OF MAC FRAMES WITH DELAYED CHANNEL ACCESS IN A WIRELESS NETWORK

(75) Inventors: Changwen Liu, Portland, OR (US); Adrian P Stephens, Cottenham (GB); Dmitry V. Akhmetov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1868 days.

(21) Appl. No.: 11/371,629

(22) Filed: Mar. 9, 2006

(65) Prior Publication Data
US 2007/0211625 A1    Sep. 13, 2007

(51) Int. Cl.
*H04W 4/00* (2009.01)
(52) U.S. Cl. ........................................... 370/329
(58) Field of Classification Search ............... 370/395.4, 370/230, 231, 329, 341
See application file for complete search history.

(56) References Cited

U.S. PATENT DOCUMENTS

| | | | | |
|---|---|---|---|---|
| 4,330,857 A * | 5/1982 | Alvarez et al. | ................ | 370/321 |
| 5,822,523 A * | 10/1998 | Rothschild et al. | ........... | 709/236 |
| 6,038,230 A * | 3/2000 | Ofek | .............................. | 370/389 |
| 6,687,227 B1 * | 2/2004 | Li et al. | ......................... | 370/231 |
| 7,145,897 B2 * | 12/2006 | Sachs et al. | .................... | 370/350 |
| 2004/0001458 A1 * | 1/2004 | Dorenbosch et al. | ........ | 370/329 |
| 2004/0013089 A1 * | 1/2004 | Taneja et al. | .................. | 370/235 |
| 2004/0179475 A1 * | 9/2004 | Hwang et al. | ................. | 370/229 |
| 2004/0264454 A1 * | 12/2004 | Rajkumar et al. | ............ | 370/389 |
| 2005/0013316 A1 * | 1/2005 | Liao et al. | ...................... | 370/449 |
| 2005/0091396 A1 * | 4/2005 | Nilakantan et al. | ........... | 709/232 |
| 2006/0120404 A1 * | 6/2006 | Sebire et al. | .................... | 370/469 |
| 2007/0091805 A1 * | 4/2007 | Ramprashad et al. | ..... | 370/230.1 |
| 2007/0142051 A1 * | 6/2007 | Xu et al. | ....................... | 455/436 |
| 2007/0153683 A1 * | 7/2007 | McAlpine | ..................... | 370/229 |
| 2007/0161364 A1 * | 7/2007 | Surineni et al. | ............ | 455/343.4 |

OTHER PUBLICATIONS

Liu, Changwen, et al., "Delayed Channel Access for IEEE 802.11e Based WLAN", Mar. 2006.
Morioka, Yuichi, et al., "TGn Sync TGn Proposal MAC Simulation Methodology", *IEEEP 802.11 Wireless LANs*, doc.: IEEE 802.11-04/0895r6, (Jul. 2005), 1-39.

* cited by examiner

*Primary Examiner* — Derrick Ferris
*Assistant Examiner* — Mohammad Anwar
(74) *Attorney, Agent, or Firm* — Schwegman, Lundberg & Woessner, P.A.; Gregory J. Gorrie

(57) ABSTRACT

Embodiments of a wireless communication device and method for dynamic bidirectional aggregation of media-access control (MAC) layer frames in a wireless network are generally described herein. Other embodiments may be described and claimed. In some embodiments, the time between consecutive bursts is dynamically varied based on a MAC channel access delay.

4 Claims, 3 Drawing Sheets

WIRELESS COMMUNICATION DEVICE AND METHOD FOR DYNAMIC BIDIRECTIONAL AGGREGATION OF MAC FRAMES WITH DELAYED CHANNEL ACCESS IN A WIRELESS NETWORK

TECHNICAL FIELD

Some embodiments of the present invention pertain to wireless communication systems. Some embodiments pertain to wireless networks, such as wireless local area networks (WLANs). Some embodiments pertain to scheduling media-access control (MAC) layer packets and frames.

BACKGROUND

In many conventional wireless networks, higher-priority packet flows receive quicker channel access than lower-priority packet flows. Although this provides for shorter wait times for the higher-priority packet flows, it results in less efficient usage of the wireless channel because the higher-priority packet flows are delivered in smaller aggregates with each burst. The lower-priority packet flows, on the other hand, utilize the wireless channel more efficiently because they may wait longer and may generally be delivered in larger aggregates. Each burst delivery requires aggregation time and a channel access process which contributes to the delay of the aggregated packets. If packets of higher-priority packet flows are aggregated into larger-size aggregates to use the wireless channel more efficiently, the increased delay may conflict with delay requirements and quality-of-service requirements of some of these higher-priority packet flows.

Further, network traffic in some conventional wireless networks tends to be bursty and self-similar. This self similarity may be manifested by the absence of a natural length of a burst. For example, bursty sub-periods may be separated by less bursty sub-periods. This is particularly the case for network traffic that use protocols such as the transmission control protocol (TCP) and the universal datagram protocol (UDP). This bursty and self-similar nature of network traffic should be considered since it may also result in an inefficient use of the wireless channel.

Thus, there are general needs for systems and methods that may use a wireless channel more efficiently without sacrificing quality-of-service requirements of some packet flows.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
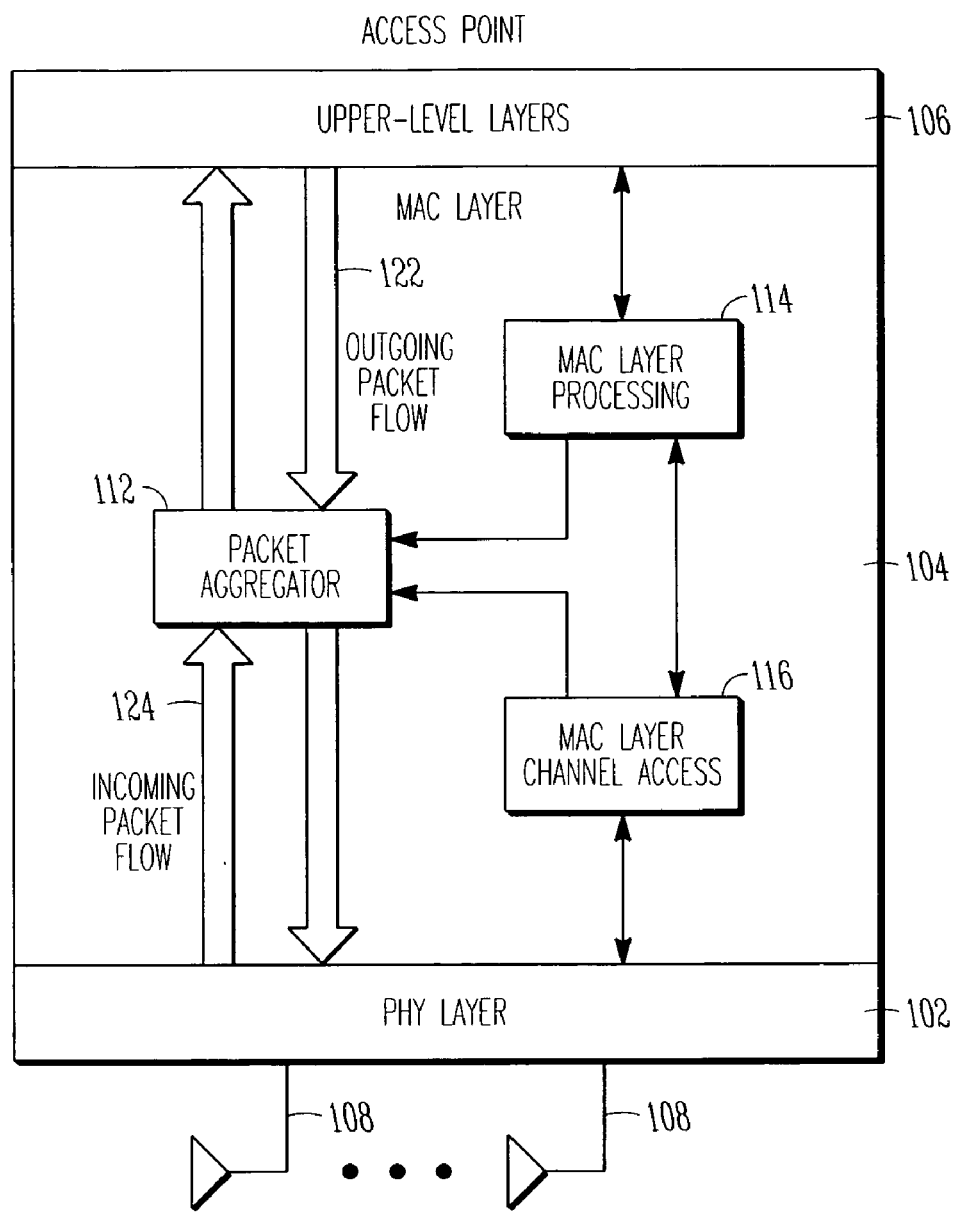
FIG. 1 is block diagram of an access point in accordance with some embodiments of the present invention.

FIG. 1 is block diagram of an access point in accordance with some embodiments of the present invention. Access point 100 may communicate with one or more mobile stations and may be part of a wireless network, such as a wireless local area network (WLAN). Access point 100 may include one or more functional layers of circuitry including physical (PHY) layer 102, media-access control (MAC) layer 104, and upper-level layers 106. PHY layer 102 may provide for the radio-frequency (RF) communications through an RF channel with mobile stations using one or more of antennas 108. MAC layer 104 may, among other things, control access to the physical medium (i.e., the wireless channel). Upper-level layers 106 may include one or more applications running on access point 100.

MAC layer 104 may receive outgoing packet flows 122 from upper-level layers 106 and may receive incoming packet flows 124 from PHY layer 102. In accordance with some embodiments, MAC layer 104 may include packet aggregator 112 to aggregate multiple outgoing packet flows 122 and/or incoming packet flows 124 into bursts as described in more detail below. In some embodiments, the inter-arrival time that characterizes a burst may be dynamically varied between consecutive bursts based on a MAC channel access delay. In accordance with some embodiments, MAC layer 104 may also include MAC layer channel access circuitry 116 to manage MAC channel access. In accordance with some embodiments, MAC layer 104 may also include MAC layer processing circuitry 114 to manage some operational parameters for packet aggregator 112 and/or MAC layer channel access circuitry 116. The operations of these functional elements of MAC layer 104 are described in more detail below.

Although access point 100 is illustrated as having several separate functional elements, one or more of the functional elements may be combined and may be implemented by combinations of software-configured elements, such as processing elements including digital signal processors (DSPs), and/or other hardware elements. For example, some elements of MAC layer 104 may include and/or utilize one or more microprocessors, DSPs, application specific integrated circuits (ASICs), and combinations of various hardware and logic circuitry for performing at least the functions described herein. In some embodiments, the functional elements of MAC layer 104 may refer to one or more processes operating on one or more processing elements.

In some embodiments, access point 100 may communicate using orthogonal frequency division multiplexed (OFDM) communication signals over multicarrier communication channels. The multicarrier communication channels may be within a predetermined frequency spectrum and may comprise a plurality of orthogonal subcarriers. In some embodiments, the communication signals may be defined by closely spaced OFDM subcarriers. Each subcarrier of the OFDM signals may have a null at substantially a center frequency of the other subcarriers and/or each subcarrier may have an integer number of cycles within a symbol period, although the scope of the invention is not limited in this respect. In some alternate embodiments, access point 100 may communicate with mobile stations using spread-spectrum signals.

In some embodiments, the frequency spectrums used for communications by access point 100 may comprise either a 5

GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some embodiments, the frequency spectrum for communications may comprise frequencies between 2 and 11 GHz, although the scope of the invention is not limited in this respect.

In some embodiments, access point 100 may communicate in accordance with specific communication standards, such as the Institute of Electrical and Electronics Engineers (IEEE) standards including IEEE 802.11 (a), 802.11 (b), 802.11 (e), 802.11 (g), and/or 802.11 (h) standards and/or proposed specifications for wireless local area networks (WLANs), and including the IEEE 802.11 task group (TGnSync) proposal for 802.11 (n), although the scope of the invention is not limited in this respect as they may also be suitable to transmit and/or receive communications in accordance with other techniques and standards. In some broadband wireless access (BWA) network embodiments, access point 100 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999" and Metropolitan Area Networks—Specific Requirements—Part 16: "Air Interface for Fixed Broadband Wireless Access Systems," May 2005 and related amendments/versions.

In some embodiments, an aggregate may comprise one or more data packets. In some embodiments in accordance with the IEEE 802.11 TGnSync proposal referenced above, one or more MAC layer packet data units (MPDUs) may be included in an aggregate, referred to as an aggregate MPDU (A-MPDU).

Although access point 100 is referred to as an access point, the scope of the invention is not limited in this respect as access point 100 may be another type of wireless communication device, including a base station, a wireless local area network communication station, or a BWA network communication station. In some embodiments, access point 100 may be a Wireless Fidelity (WiFi) access point, while in other embodiments access point 100 may be a communication station of a BWA network, such as a Worldwide Interoperability for Microwave Access (WiMax) network, although the scope of the invention is not limited in this respect. In some embodiments, access point 100 may be a portable wireless communication device, such as personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that may receive and/or transmit information wirelessly.

Antennas 108 may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 108 may be effectively separated to take advantage of spatial diversity and the different channel characteristics that may result between each of antennas 108 and the mobile stations. In some embodiments, mobile-station antennas 108 may be separated by up to $1/10$ of a wavelength or more.

Figure 2:
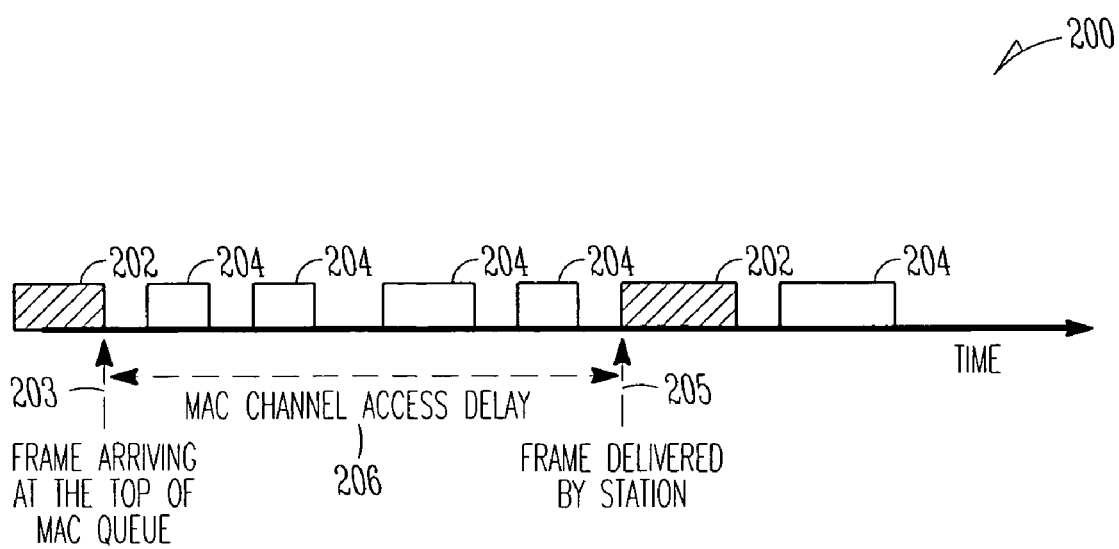
FIG. 2 illustrates MAC channel access delay in accordance with some embodiments of the present invention.

FIG. 2 illustrates MAC channel access delay in accordance with some embodiments of the present invention. Channel 200 is observed as being busy by a communication station, such as access point 100 (FIG. 1), during busy periods 202. Transmission opportunities (TXOP) 204 may include times during which a burst may be transmitted by a communication station, such as access point 100 (FIG. 1). MAC channel access delay 206 for a MAC frame is illustrated as a time difference between when an attempt to acquire the channel for a frame is started (i.e., time 203) to when the frame is successfully delivered by the communication station (i.e., time 205). Start time 203 may refer to the time a frames arrives at the top of the MAC queue, although the scope of the invention is not limited in this respect.

Referring to FIGS. 1 and 2 together, in accordance with some embodiments, packet aggregator 112 may aggregate packets of outgoing packet flow 122 for a burst until a dynamically varied packet inter-arrival time is exceeded, a predetermined maximum packet delay time is exceeded or a predetermined maximum number of buffered packets is exceeded. In these embodiments, MAC layer channel access circuitry 116 may dynamically vary the packet inter-arrival time that may uniquely characterize different bursts based on MAC channel access delay 206.

In some embodiments, the packet inter-arrival time may be updated based on MAC channel access delay 206 of the delivered aggregate. In some embodiments, MAC layer channel access circuitry 116 may delay channel access until the aggregating is complete.

In some embodiments, packet aggregator 112 may deliver the aggregated packets when a channel is acquired. Channel access circuitry 116 may update the packet inter-arrival time based on a current MAC channel access delay of the delivered aggregate. In these embodiments, packet aggregator 112 may continue to aggregate the MAC layer packets until the dynamically varied packet inter-arrival time is exceeded, the predetermined maximum packet delay time is exceeded or the predetermined maximum number of buffered packets is exceeded.

In these embodiments, the packet inter-arrival time may be estimated for a particular flow and may be updated for a transmission opportunity that actually delivers packets of a completed aggregate. In some embodiments, the packet inter-arrival time is not updated when the aggregate is not successfully delivered, although the scope of the invention is not limited in this respect.

In some embodiments, MAC layer channel access circuitry 116 may further update the estimated packet inter-arrival time based on an acknowledge transmission duration and/or a short inter-frame space time. In some example embodiments, the minimum identifiable burst rate may be about 10 packets per second, and the maximal identifiable burst rate may be 10,000 packets per second, although the scope of the invention may be limited in this respect as other values may be used.

In some embodiments, channel access circuitry 116 may measure MAC channel access delay 206 of the delivered aggregated packets based on starting time 203 for a channel access attempt and a starting transmission time. MAC channel access delay 206 of the delivered aggregate may be determined by subtracting starting time 203 for the channel access attempt from the starting transmission time. In some embodiments, MAC channel access delay 206 may be the access delay of a station delivering a predetermined number of aggregates. In some embodiments, MAC channel access delay 206 may be measured immediately after the transmission opportunity in which the final aggregate of the predetermined number is transmitted, although the scope of the invention is not limited in this respect.

In some embodiments, MAC layer processing circuitry 114 may determine the maximum packet delay time based on a quality-of-service requirement for the flow. In some embodiments, the maximum packet delay time may be predetermined. In some embodiments, the maximum packet delay time may be set to a default value of approximately 100 milliseconds (ms) as a maximal delay for a flow, although the scope of the invention is not limited in this respect. In some embodiments that implement the transmission control protocol (TCP), a maximum delay of 200 ms delay may be required for sending an acknowledgement (ACK) packet. In these TCP embodiments, a maximum packet delay time of 100 ms (i.e., 200 ms/2) may be selected for a TCP flow. In some embodiments, the maximum packet delay time may be flow specific and may be set in real-time. For example, the maximum packet delay time may be set in real-time to a lower value to satisfy flow requirements, such as quality-of-service requirements and delay requirements for particular flows. In some embodiments, the maximum packet delay time may be set to a fraction of the maximum delay bound of a quality-of-service flow, although the scope of the invention is not limited in this respect. In some embodiments, the fraction may range between ¼ and ¾, and in some cases, may be set to about ½, although the scope of the invention is not limited in this respect.

In some embodiments, the predetermined maximum number of buffered packets may be a constant σ that is used to determine the maximum number of packets in an aggregation buffer before aggregation is triggered. In some embodiments, the constant σ may be about forty-eight, although other values for constant σ may also be used.

In some embodiments, packet aggregator 112 may separately aggregate packets of different flows. For example, packet aggregator 112 may aggregate packets of a first flow having a common destination, an access category and/or a traffic identifier. In some embodiments, packet aggregator 112 may aggregate packets of a second flow separately from the first flow until a packet inter-arrival time is exceeded for the second flow, until a maximum packet delay time is exceeded for the second flow, or a predetermined maximum number of buffered packets is exceeded for the second flow.

In some embodiments, the estimated packet inter-arrival time ($\alpha$) may be dynamically varied based on a time-difference between a channel access start time (Tca) and a time of the transmission of the aggregate (Ttx), multiplied by a constant ($\lambda$). In some embodiments, the following equation may be used to dynamically vary the packet inter-arrival time:

$$\alpha = \lambda(Ttx - Tca).$$

In these embodiments, $\lambda$ may be a constant that may be based on the ratio of packet inter-arrival time to the channel access delay, although the scope of the invention is not limited in this respect. In some embodiments, $\lambda$ may be greater than two, and in some embodiments, $\lambda$ may be about ten, although the scope of the invention is not limited in this respect.

In some embodiments, MAC layer channel access circuitry 116 may dynamically vary the time between consecutive bursts separately for outgoing packet flows 122 and incoming packet flows 124, and packet aggregator 112 may separately aggregate packets of outgoing packet flows 122 and incoming packet flows 124. In these embodiments, outgoing packet flows 122 may refer to packet flows that are transmitted from an access point, such as access point 100, to a destination, such as a mobile station. Incoming packet flows 124 may refer to packet flows that are received by an access point, such as access point 100, from a destination, such as a mobile station.

In some embodiments, packet aggregator 112 may aggregate packets of a flow until a reverse grant from a channel access initiator is received. When a reverse grant from a channel access initiator is received, packet aggregator 112 may form an aggregate from existing packets and may send the aggregate in a reverse direction. In some embodiments, MAC layer channel access circuitry 116 may refrain from updating the packet inter-arrival time. In these embodiments, an aggregate may be formed of existing packets of the flow without exceeding an allocated reverse flow duration. The aggregate may be sent in the reverse direction to the initiator. In these embodiments, the aggregation process may be restarted without updating the estimated packet inter-arrival time. In these embodiments, because the packet inter-arrival time is estimated and is set for maximizing throughput, it may not need to be updated in the case of a reverse grant due to the incomplete formation of the aggregate, although the scope of the invention is not limited in this respect.

In some embodiments, packet aggregator 112 may aggregate multiple MAC frames into a single physical layer frame and may deliver the aggregation of multiple MAC frames to physical layer 102 with one physical channel access, although the scope of the invention is not limited in this respect.

In some embodiments, a burst for a particular packet flow may comprise a sequence of packets and may be bounded by the first and last packets. A burst may be uniquely identified by an arrival rate or an inter-arrival time for the flow that satisfies a delay-jitter bound between consecutive packets and a minimum time separation between consecutive bursts.

Figure 3:
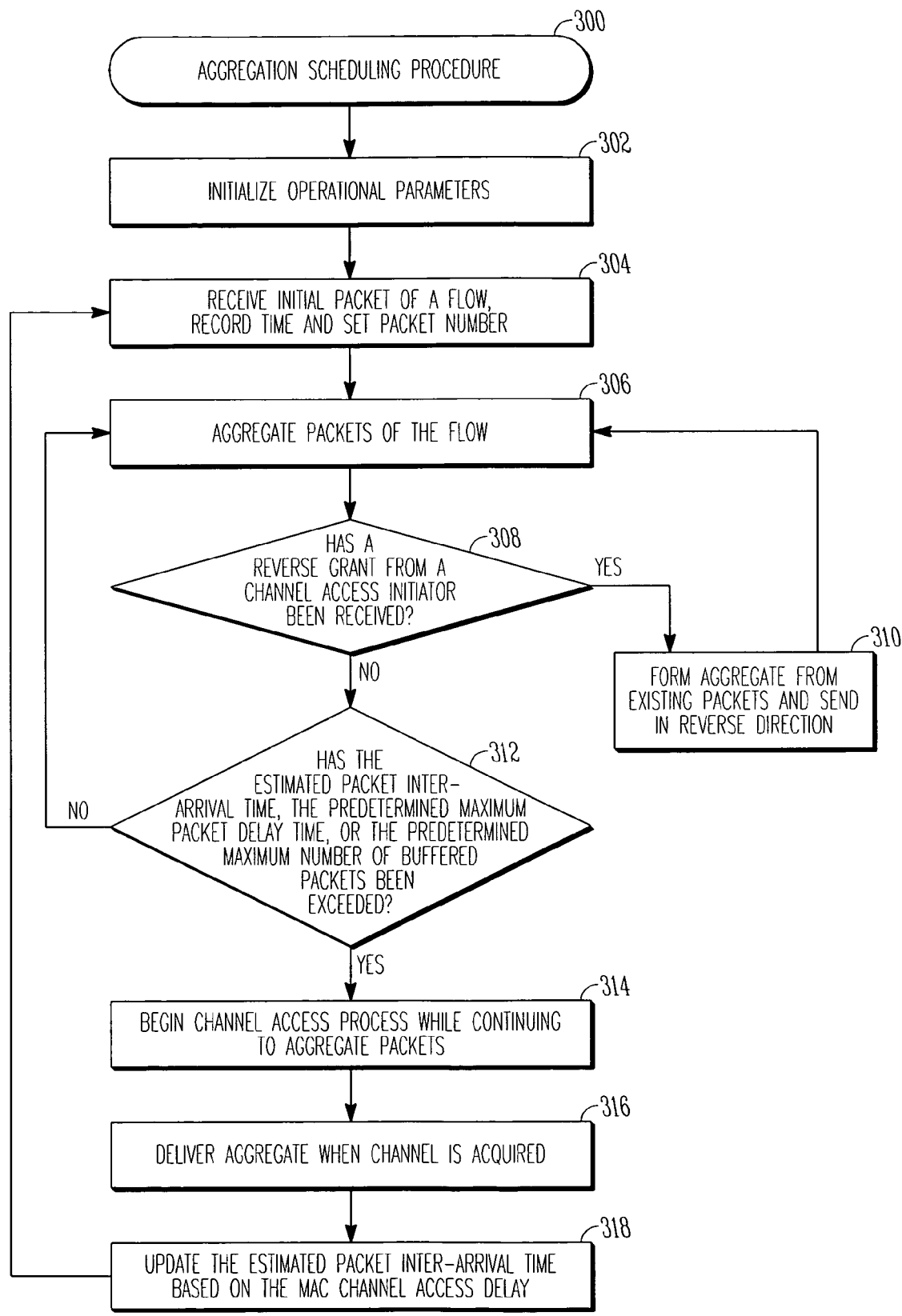
FIG. 3 is a flow chart of a packet aggregation scheduling procedure in accordance with some embodiments of the present invention.

FIG. 3 is a flow chart of a packet aggregation scheduling procedure in accordance with some embodiments of the present invention. Aggregation scheduling procedure 300 may be performed by media access control layer circuitry of a wireless network communication station, such as MAC layer 104 (FIG. 1) of access point 100 (FIG. 1). In some embodiments, aggregation scheduling procedure 300 may dynamically vary the time between consecutive bursts based on a MAC channel access delay, among other things, to possibly improve the efficient usage of a channel's capacity.

In operation 302, the operational parameters are initialized. In some embodiments, the estimated packet inter-arrival time is initially set to a predetermined maximum burst rate, such as the maximal identifiable burst rate. In some embodiments, the maximum identifiable burst rate and may be on the order of 10,000 packets per second, although the scope of the invention is not limited in this respect.

In operation 304, an initial packet of a flow may be received, the time may be recorded and the packet number may be set. In some embodiments, the initial packet may be received from upper-level layers 106 (FIG. 1) of access point 100 (FIG. 1). In some embodiments, operation 304 comprises receiving the first packet of a particular flow. For a MAC destination, for packets received from upper-level layers 106 (FIG. 1), and for the first packet for each MAC address, operation 304 may comprise setting the packet number to one and recording the initial time.

Operation 306 comprises aggregating packets of a flow. In some embodiments, operation 306 comprises aggregating packets separately for each MAC address.

Operation 308 determines whether a reverse grant has been received from a channel access initiator. In these embodiments, access point 100 (FIG. 1) may act as the channel access responder. When a reverse grant is received, operation 310 is performed. If a reverse grant is not been received, operation 312 is performed.

Operation 310 forms an aggregate from the existing packets that were aggregated in operation 306 for the flow for which the reverse grant was received. The aggregate may be sent in the reverse direction.

Operation 312 determines if the estimated packet inter-arrival time ($\alpha$) has been exceeded, the predetermined maximum packet delay time has been exceeded or a predetermined maximum number of buffered packets is exceeded. As long as the estimated packet inter-arrival time has not been exceeded, the maximum packet delay time has not been exceeded, or the predetermined maximum number of buffered packets has not been exceeded, operation 306 may continue to aggregate packets for a particular flow. When the packet inter-arrival time, the maximum packet delay time or the predetermined maximum number of buffered packets has been exceeded, operation 314 may be performed.

Operation 314 comprises beginning the channel access process while continuing to aggregate packets. The channel access process may result in the acquisition of a physical layer channel for transmission of a burst.

Operation 316 comprises delivering the aggregate as a burst when the channel is acquired. In some embodiments, packets may continue to be aggregated in operation 306 until the channel is actually acquired.

In operation 318, the packet inter-arrival time may be updated when the burst in operation 316 is successfully delivered. In some embodiments, the estimated packet inter-arrival time may be updated based on the MAC channel access delay as discussed above. Operation 304 may be repeated for packets that are to be aggregated into a subsequent burst. When the burst is not successful, the packet inter-arrival time is not updated and operation 304 may be repeated for packets that are to be aggregated into a subsequent or next burst.

Although the individual operations of procedure 300 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission, or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method of aggregating packets of a media-access control (MAC) layer flow performed by a wireless communication device, the method comprising:
aggregating MAC layer packets of the MAC layer flow until an estimated packet inter-arrival time is exceeded, until a maximum packet delay time is exceeded, or until a predetermined maximum number of buffered packets is exceeded; and
delaying a channel access attempt until the aggregating is complete, wherein time between consecutive bursts is dynamically varied based on a MAC channel access delay, and
wherein the maximum packet delay time comprises a fraction of a maximum delay bound of the quality-of-service requirement for the MAC layer flow, the fraction ranging between ¼ and ¾.

2. A method of aggregating packets of a media-access control (MAC) layer flow performed by a wireless communication device, the method comprising:
aggregating MAC layer packets of the MAC layer flow until an estimated packet inter-arrival time is exceeded, until a maximum packet delay time is exceeded, or until a predetermined maximum number of buffered packets is exceeded; and
delaying a channel access attempt until the aggregating is complete,
wherein time between consecutive bursts is dynamically varied based on a MAC channel access delay, and
wherein aggregating packets comprises aggregating packets until a reverse grant from a channel access initiator is received, and
wherein when a reverse grant from a channel access initiator is received, the method further comprises:
forming an aggregate from existing packets and sending the aggregate in a reverse direction; and
refraining from updating the estimated packet inter-arrival time.

3. A wireless communication device comprising:
a packet aggregator to aggregate packets of a media-access control (MAC) layer flow for a burst until an estimated packet inter-arrival time is exceeded, a maximum packet delay time is exceeded, or a predetermined maximum number of buffered packets is exceeded;

channel access circuitry to delay a channel access attempt until the aggregating is complete and to dynamically vary time between consecutive bursts based on a MAC channel access delay; and MAC layer processing circuitry to determine the maximum packet delay time as a fraction of a maximum delay bound of the quality-of-service requirement for the MAC layer flow, the fraction ranging between ¼ and ¾.

4. A wireless communication device comprising:

a packet aggregator to aggregate packets of a media-access control (MAC) layer flow for a burst until an estimated packet inter-arrival time is exceeded, a maximum packet delay time is exceeded, or a predetermined maximum number of buffered packets is exceeded; and channel access circuitry to delay a channel access attempt until the aggregating is complete and to dynamically vary time between consecutive bursts based on a MAC channel access delay, wherein the packet aggregator aggregates packets of a flow until a reverse grant from a channel access initiator is received, wherein when a reverse grant from a channel access initiator is received, the packet aggregator forms an aggregate from existing packets and sends the aggregate in a reverse direction, and wherein the MAC layer channel access circuitry refrains from updating the estimated packet inter-arrival time.

* * * * *